United States Patent [19]

Gobert

[11] Patent Number: 5,102,378
[45] Date of Patent: Apr. 7, 1992

[54] LIMITED SLIP DIFFERENTIAL

[75] Inventor: Michel Gobert, Paris, France

[73] Assignee: Ste Pierre Ferry, Asnieres, France

[21] Appl. No.: 619,445

[22] Filed: Nov. 29, 1990

Related U.S. Application Data

[63] Continuation-in-part of Ser. No. 428,107, Oct. 27, 1989.

[51] Int. Cl.⁵ .................................................. F16H 1/44
[52] U.S. Cl. ...................................... 475/231; 475/240; 475/249
[58] Field of Search ........................ 475/231, 249, 240

[56] References Cited

U.S. PATENT DOCUMENTS

| | | | |
|---|---|---|---|
| 2,855,805 | 10/1958 | Fallon | 74/711 |
| 3,055,234 | 5/1959 | O'Brien | 74/711 |
| 3,457,807 | 7/1969 | Altman | 475/240 |
| 3,546,968 | 12/1970 | Altman | 475/240 |
| 3,906,812 | 9/1975 | Kagata | 475/235 |
| 4,679,463 | 7/1987 | Ozaki et al. | 475/231 |
| 4,966,249 | 10/1990 | Imaseki | 475/231 |
| 4,978,329 | 12/1990 | Yasui et al. | 475/231 |

FOREIGN PATENT DOCUMENTS

| | | |
|---|---|---|
| 888808 | 7/1949 | Fed. Rep. of Germany . |
| 926469 | 4/1955 | Fed. Rep. of Germany . |
| 1572402 | 6/1969 | France . |
| 2380158 | 2/1977 | France . |
| 2547883 | 6/1983 | France . |
| 2604504 | 4/1988 | France . |
| 58-221046 | 12/1983 | Japan .............................. 475/231 |
| 1-49740 | 1/1989 | Japan .............................. 475/231 |
| 0992865 | 1/1983 | U.S.S.R. ......................... 475/231 |
| 1115929 | 9/1984 | U.S.S.R. ......................... 475/240 |
| 1120132 | 10/1984 | U.S.S.R. ......................... 475/240 |
| 1230874 | 5/1986 | U.S.S.R. ......................... 475/240 |
| 1280480 | 7/1972 | United Kingdom ............. 475/231 |

Primary Examiner—Leslie A. Braun
Assistant Examiner—Ryan W. Massey
Attorney, Agent, or Firm—Reising, Ethington, Barnard, Perry & Milton

[57] ABSTRACT

The present invention relates to a limited slip differential of the general type wherein when one of the driving wheels begins to slip or loses traction driving power is transmitted to the wheel retaining traction. The unique features of this invention involve utilizing engine input torque as the force for progressively actuating a clutch to couple differential elements to direct power to a driving wheel having traction; constantly sensing the differences between the engine input torque and the resistive torques of the driving wheels; and limiting the resistive torque of the driving wheels which can act in opposition to the clutch-applying force of the engine input torque to the differential.

12 Claims, 9 Drawing Sheets

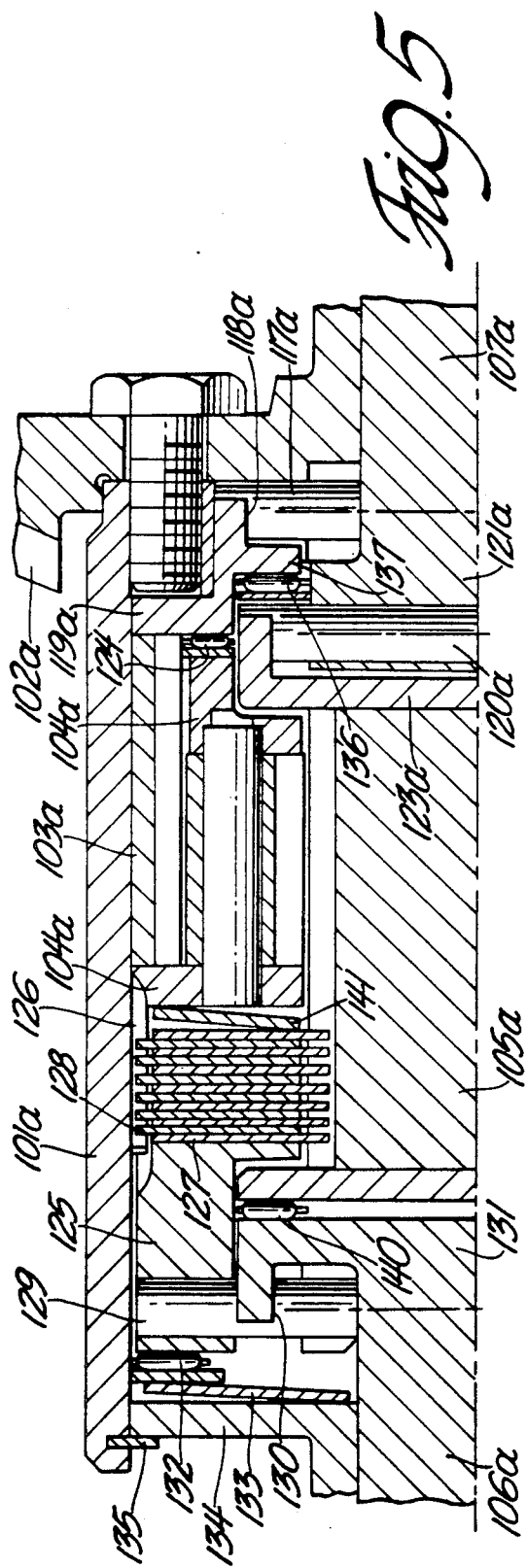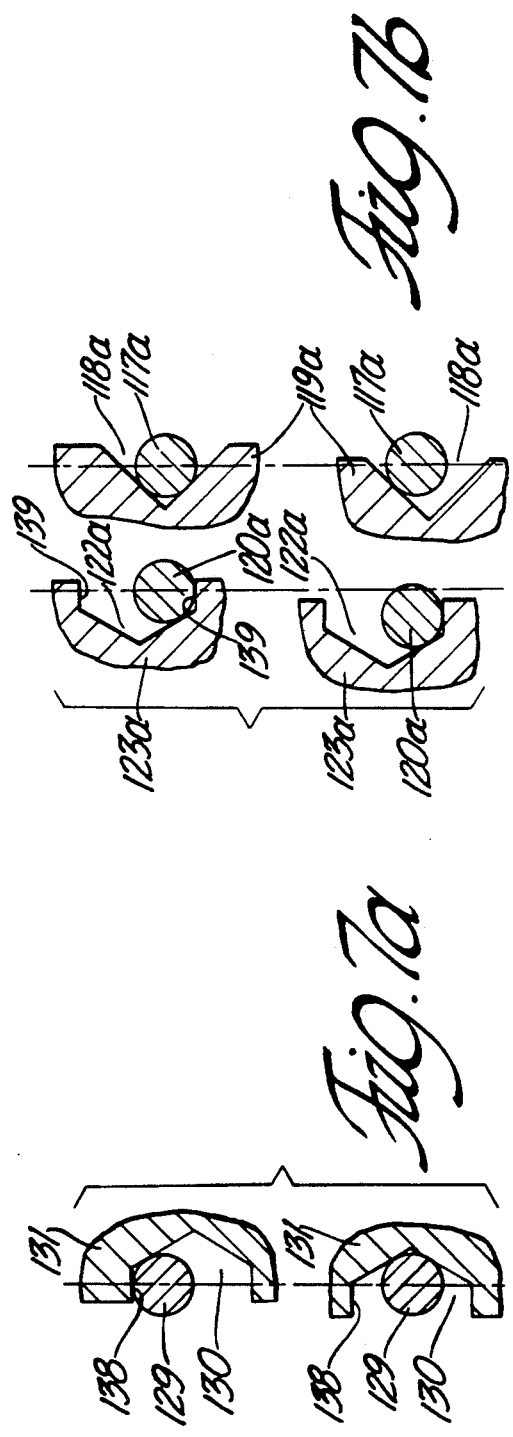

LIMITED SLIP DIFFERENTIAL

This is a continuation-in-part of copending application Ser. No. 428,107 filed Oct. 27, 1989 entitled "Self-Locking Bevel Gear Differential" by the same inventor, Michael Gobert.

TECHNICAL FIELD

The purpose of the automobile differential is to transmit the torque available from the motor to the driving wheels while at the same time enabling the independent rotation of each wheel. The speed of rotation of the wheels is determined by two factors: the road conditions (the road surface, the curvature of the road, the speed of the vehicle) and the characteristics of the vehicle (the axle, the wheel base, the actual circumference of the tires).

For a four wheel drive vehicle, three differentials are required: one between the front drive wheels, one between the rear drive wheels, and a third between the front and rear axles.

A differential can be constructed from either cylindrical or conical gears. The majority of automotive applications use conical gears. The use of conical gears has the limitation that torque can only be distributed equally to each of the output drive shafts (i.e., each wheel always receives 50% of the available torque). Systems which use epicycloidal gears have the advantage that they can be designed to distribute torque in ratios other than 50:50. All differentials which are not specifically designed as limited slip differentials have the limitation that the maximum torque transmitted to the drive shafts is determined by the wheel with least traction. For example, during a hill start where one wheel is positioned on muddy ground and the other on the road surface, the traditional differential allows the first wheel to spin while the second wheel with traction remains stationary. A differential which divides torque equally between the two drive wheels does not allow the vehicle to take full advantage of the wheel with the most traction.

For many years, design of limited slip differentials have been available with aim to minimize this weakness. According to the situation, they provide an asymmetric distribution of torque which in turn provides a better utilization of the torque available from the motor. These designs vary the mechanical drive available from the gear train, some according to the speed differential between the two output drive shafts, others according to the torque applied to the input drive shaft.

The limited slip differential of this invention varies the torque available to each output drive shaft according to the torque applied to the input drive as compared with the resistive torque available at each of the output drives.

The purpose of the present invention is to provide a limited slip differential wherein more than 50% of the engine torque can be delivered to the driving wheel having the most traction while less than 50% of the engine torque can be delivered to the driving wheel with the least traction. This is achieved by providing a differential system wherein the engine input torque to the differential constantly acts in opposition to the resistive or traction induced torque of each of the driving wheels to control driving torque distribution to the wheels through a clutching mechanism. The system also includes means for limiting the resistive torque opposing the engine input torque whereby the engine input torque provides either the primary or the entire force for progressively providing over 40% of the engine torque to the driving wheel with the most traction.

BACKGROUND ART

Typically previous limited slip differentials have an input element, two output elements, two output shafts associated each with one of the output elements, and axially displaceable means such as disk or cone clutches for the purpose of coupling together, by their axial displacement, two of the three input and output shafts.

This axial displacement can include spring means to take-up play within the clutch, however, the essential operating parameter is not the displacement itself but the force applied to the coupling means. The result of this coupling, which can be total or partial depending on the means used, is that when the resistive torque at one of the outputs decreases, the input torque is shared equally between the two outputs.

Typical of the numerous prior art patents relating to limited slip differentials are U.S. Pat. No. 3,457,807 Altmann; U.S. Pat. No. 3,546,968 Altmann; and U.S. Pat. No. 3,906,812 Kagata. Both Altmann differentials as well as Kagata are of the type wherein a clutch applying force is through springs with the spring force being opposed by the resistive torque of the output shaft. In the Altmann patents the springs provide the sole clutch applying force. This basically is the same operation in Kagata in that either the sole or controlling clutch applying force is through springs. Kagata has a modification in which a cam device comes into play after the spring has actuated the lock-up clutch to provide an added force to help hold the clutch in engagement.

SUMMARY OF THE INVENTION

The prior art devices are to be distinguished from applicant's invention wherein engine input torque to the differential is the sole or primary force progressively applying the clutch coupling force as constantly opposed by the resistive torques of the wheel driving shafts. Further, applicant provides means for limiting the extent to which the resistive torque can oppose the engine input torque.

The subject matter of the invention is a self-locking differential including an input element, two output elements, two output shafts associated each with one of the output elements, and axially movable clutch means for coupling together, by its axial displacement, two of the three input and output elements, characterized by the fact that it includes a resistive torque responsive device associated with each output shaft to oppose the said axial displacement of the clutch means as long as the resistive torque of the output shafts is greater than engine input torque to the differential and which latter torque controls the progressive clutch engagement.

In the case of a differential with bevel gears, in which the input element is constituted by a satellite holder and the two output elements are constituted by two planetary or side gears, each resistive torque responsive device can be operatively disposed between one of the planetary gears and the output shaft associated with it.

In an embodiment, not shown, the resistive torque responsive device may be constituted by the gears themselves which, by the torque reaction between their teeth, can create a force which acts against the clutch applying force of the engine input torque. In such embodiment, each planetary gear can be made in one piece with the output shaft which is associated with it.

In another embodiment, the resistive torque responsive device can include at least a first radial cam follower engaged in a first cam of V-shaped cross section, the first radial cam follower being made to rotate by one of the elements constituted by the planetary gear and by the output shaft, and the first radial cam follower being formed in an element which is made to rotate by the other of these elements, the resistive torque being transmitted from the output shaft to the planetary gear by the thrust of the said first radial cam follower against one of the flanks of the said first cam, and the relative axial movement of the first cam follower and of the first cam opposing the axial displacement of the coupling means or clutch by the force of the engine input torque to the differential. It is understood that, since the axis of the cam follower is parallel to the apex of the V, the two flanks of the V form ramps such that as long as the output torque transmitted from the planetary gear to the output shaft is sufficiently great, the cam follower will tend to run up these ramps. The relative axial movement that results is utilized to oppose the axial movement of the clutch coupling force of engine input torque.

As the resistive torque decreases, the cam follower returns to its place in the cam, thus permitting the coupling means to move axially by the engine input torque and thereby to progressively couple the two desired elements of the three input and output elements. Of course, the cam follower is not necessarily an element separate from the one in which it is mounted. It can consist, for example, of an integral rib of semicircular or V shape formed on a surface of this element. Likewise, the flanks of the V-shaped cam can be other than symmetrical, and possibly can be other than flat, to obtain, for example, a particular progressive clutch action. The first radial cam follower can furthermore be engaged in two first cams confronting one another, one of these cams being formed in an element corotational with the planetary gear and the other cam being formed in an element corotational with the output shaft. The cam follower then has the effect of tending to separate the two cam-containing elements axially by thrusting against the opposite flanks of the two cams.

In one embodiment, the coupling means include a clutch having two sets of interleaved disks, the disks of the one set being corotational with one of the elements to be coupled together, and the disks of the other set being corotational with the other element to be coupled, the said axial displacement producing a rubbing of one of the sets of disks against the other.

In another embodiment, the coupling means can include a jaw clutch involving, for example, the confronting ends of the planetary gear shafts, one of the shafts being fluted internally and the other shaft being fluted externally. A cone clutch might also be provided.

In the various embodiments a resilient means or spring can be utilized to take up slack in the coupling means to bring the clutch to an axial coupling position in which the engine input torque actually controls the clutching engaging force in opposition to the force created by the resistive torque of the drive wheels.

In the case of an epicyclic differential, the coupling means can act by an axial displacement of the input element under the action of thrusting means acting when there is a decrease in one of the output torques.

In another embodiment, the locking means can include at least a third radial cam follower engaged in a third V-shaped cam, the third cam follower being corotational with one of the elements constituted by the output shaft corresponding to one of the output elements and by this output element itself, and the third cam being formed in the other of these elements, the corresponding resistive torque being applied to the output element by the thrust exerted by the third cam follower on one of the flanks of the third cam. The resistive torque causes the third cam follower to ride up on one of the ramps formed by the third V-shaped cam, resulting in a relative axial displacement between the element holding the third cam follower, this axial displacement being used to overcome the input torque actuated thrusting means. If this resistive torque decreases below a given value, the third cam follower returns to its place in the third cam, thus permitting the engine input torque to actuate the clutch means and thereby permitting a coupling together of the two desired elements with one of the three input and output elements More particularly, the third radial cam follower can be mounted for corotation with the output shaft corresponding to the planetary gear and the third cam can be formed in the said planetary gear. As far as the other output is concerned, several embodiments can be envisaged In one embodiment, the input element includes the ring gear of the epicyclic train, and the second output element includes the satellite holder of the epicyclic train, at least one fourth cam follower being corotational with the satellite holder and engaged in a cam of V-shaped cross section formed in an element affixed to the output shaft corresponding to the satellite holder, the resistive torque being transmitted from the said output shaft to the satellite holder through the said fourth cam follower. Here, again, a sufficient resistive torque produces an axial separation of the element supporting the fourth cam follower with respect to the output shaft corresponding to the satellite holder, this axial displacement locking the thrusting means. A reduction of the resistive torque, however, brings the fourth cam follower into the fourth cam, thus permitting the axial displacement of the input element and consequently the coupling together of the two elements desired, with one of the three input and output elements.

In this foregoing embodiment, the said fourth cam follower can be mounted in a counterthrusting element corotational with the satellite holder, the said coupling means being mounted between the ring gear and the said counterthrusting element More particularly, the planetary gear and the said element corotational with the output shaft can be mounted so as to abut against one another and disposed in an axially sliding manner with respect to the differential case.

In another embodiment, the input element includes the satellite holder of the epicyclic train, and the second output element includes the ring gear of the epicyclic train, at least one fifth radial cam follower being corotational with the output shaft corresponding to the ring gear, and engaged in a fifth cam of V-shaped cross section formed in the ring gear, the resistive torque being transmitted from the said output shaft to the ring gear through the said fifth cam follower. In this other embodiment, the said ring gear can be mounted so as to be fixed axially with respect to the differential case, the said coupling means being disposed between the said ring gear and the planetary gear. The fifth cam follower can be more particularly mounted in an element affixed to the said output shaft, this element and the planetary gear thrusting one against the other and disposed slidingly with respect to the case of the differential.

BRIEF DESCRIPTION OF THE DRAWINGS

FIG. 5 is an axial cross section of half of an epicyclic gear differential according to a third embodiment of the invention.

FIGS. 7a and 7b illustrate the operation of this third embodiment.

DESCRIPTION OF PREFERRED EMBODIMENTS

Figure 1:
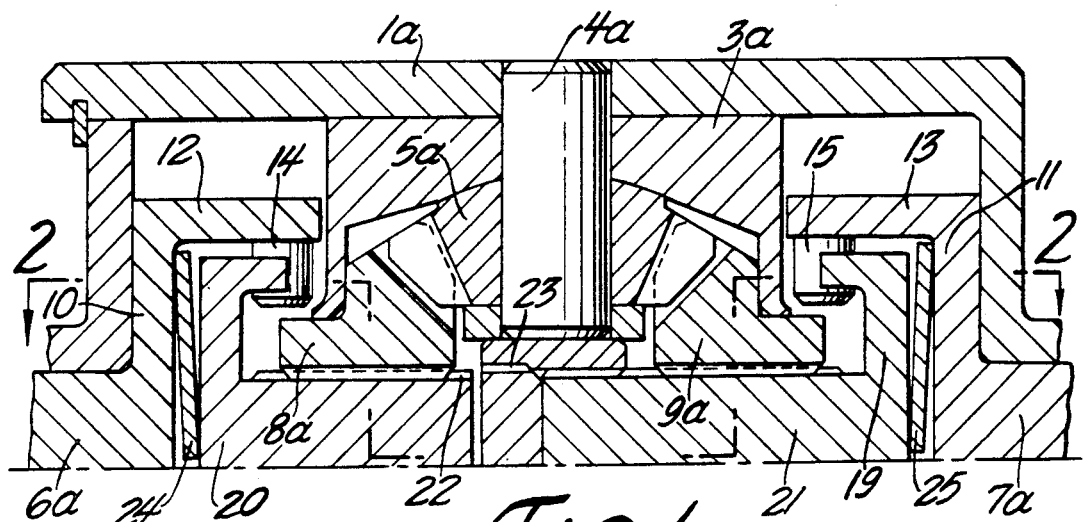
FIG. 1 is an axial cross section of one half of a bevel gear differential in a first embodiment.
Figure 3:
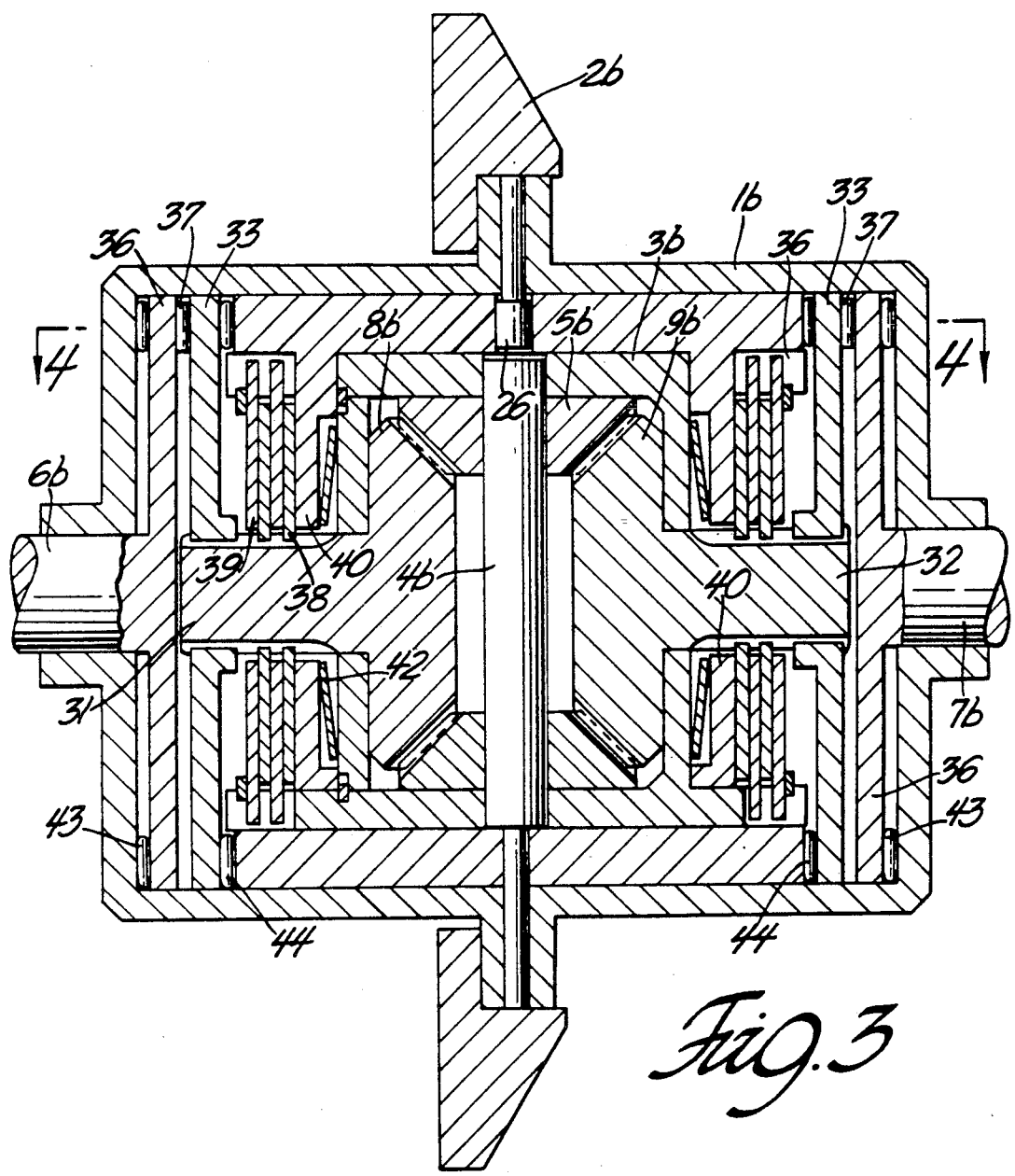

The elements common to the first two embodiments shown respectively in FIGS. 1 and 3 have been given the same reference numbers with the suffix a for the first embodiment and b for the second.

These two bevel gear differentials have, in a known manner, a case 1a, 1b to which an input bevel gear 2b (not shown in FIG. 1) is affixed, a satellite holder 3a, 3b affixed for corotation to the case 1a, 1b, and supporting the shafts 4a, 4b of the satellites 5a, 5b, two output shafts 6a, 6b, and 7a, 7b, respectively, and two planetary gears 8a, 8b and 9a, 9b, respectively, meshing with the satellites 5a, 5b.

Reference will now be made more particularly to the first embodiment in FIG. 1.

The output shafts 6a and 7a terminate inside of the case 1a in plates 10 and 11, respectively, which thrust against the ends of the case, these plates each bearing on their periphery a set of axial prolongations 12 and 13. These prolongations bear radial cam followers 14, 15.

Each radial cam follower is engaged in a cam 16, 17, formed respectively in radial projections 18, 19, of splineshafts 20, 21, coaxial with the Shafts 20 and 21 bear, in their axially external zone, external flutes or splines in which the gears 8a and 9a are respectively engaged.

At its radially internal end, the splineshaft 20 likewise bears external flutes 22, whereas shaft 21 bears at its radially internal end the internal flutes 23 adapted to receive the flutes 22 of shaft 20.

Lastly, two Belleville spring washers 24 and 25 are disposed between the inside faces of plates 10 and 11 and the axially external ends of shafts 20 and 21, to urge these two shafts against one another so as to seek to engage flutes 22 with flutes 23.

As shown in FIGS. 2, the cams 16 and 17 have their open sides facing the plane of symmetry of the differential.

The input torque applied to the case 1a is transmitted to shafts 20 and 21 through the satellite holder 3a, the satellite gears 5a, and planetary gears 8a, 9a.

It is then transmitted, through the cam followers 14 and 15 thrusting against the flanks of the indentations 16 and 17, to the output shafts 6a and 6b.

Figure 2A:
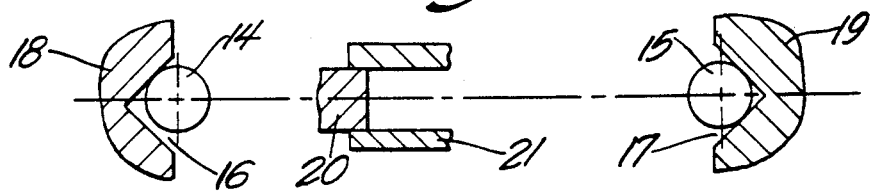
FIG. 2A, 2B and 2C are fragmentary cross sections taken along line II—II of FIG. 1, explaining the FIG. 3 is an axial cross section of a second embodiment.
Figure 2B:
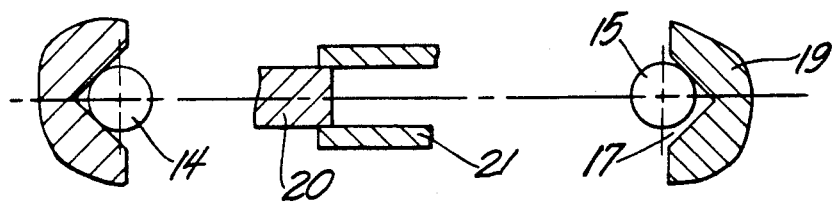
Figure 2C:
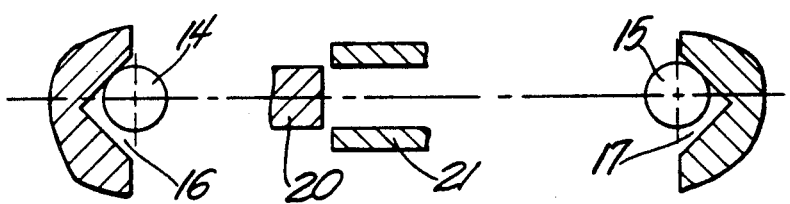

FIG. 2C represents the differential in its normal operation. In this state of operation, the resistive torques on the output shafts 6a and 7a produce a spinning and relative sliding of the cam followers 14 and 15 along ramps formed by the cams 16 and 17, respectively, this sliding producing a separation of shafts 20 and 21 against the action of the spring washers 24 and 25.

In this state, in which the shafts 20 and 21 are held apart, the flutes 22 and 23 are not engaged, such that these shafts 20 and 21 are independent in rotation. The operation of the differential is therefore normal operation.

If now the resistive torque applied to the output shaft 6a decreases, the cam followers 14 run back down the ramps of the cams 16 to reach the bottom of these indentations, as represented in FIG. 2b. Shaft 20 is thus thrust toward the right in FIGS. 1 and 2 by the spring washers 24, so that the flutes 22 become engaged in cams 23, thus coupling together the shafts 20 and 21. The differential is thus locked.

FIG. 2A represents the symmetrical case, in which the resistive torque applied to the output shaft 7a decrease, permitting shaft 21 to shift to the left and enabling a lock-up of the differential under the same circumstances.

Both in the present embodiment and in the one described below, the coupling is produced between the two outputs. It is known, however, that the locking of a differential can likewise be obtained by locking up the input and one output. This could be brought about in the present case by replacing the flutes 22 and 23 of shafts 20 and 21 with jaws formed on the axially interior ends of the prolongations 18 and 19 on either side of the indentations 16 and 17, and disposed so as to engage in corresponding recesses formed in the satellite holder 3.

Figure 4:
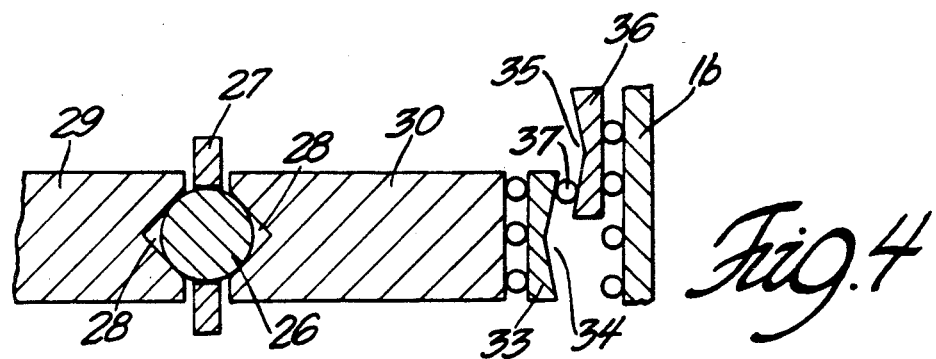
FIG. 4 is a fragmentary cross section taken along line IV—IV of FIG. 3.

We shall now turn to the second embodiment in FIGS. 3 and 4, the description of which has been initiated above as regards the parts it has in common with the first embodiment.

The satellite holder 3b is driven in rotation from the case 1b by means of radial cam followers 26 affixed to the ends of the satellite holding shafts 4b and alternating with the drive fingers 27 affixed to the case 1b.

The cam followers 26 are furthermore engaged in V-shaped cams 28 formed in two thrusters 29 and 30 disposed between the case 1b and the satellite holder 3b. The cams 28 face one another and consequently grasp the cam follower 26.

The shafts 31, 32 of the planetary gears, which are integral with the latter, are externally fluted and with these flutes they cause the rotation of a plate 33 having radial indentations 34 facing axially toward the outside and confronting radial indentations 35 formed in a plate 36 that is corotational with one of the output shafts 6b and 7b. Radial rollers 37 are engaged between the plates 33 and 36 within the confronting indentations 34 and 35.

The flutes of each shaft 31 and 32 furthermore hold a first set of clutch disks 38 interleaved with a second set of clutch disks 39 mounted in recesses in the satellite holder 3b. The disks 38 are consequently corotational with the planetary gears 8b and 9b, while disks 39 are corotational with the satellite holder 3b.

Disks 38 and 39 are blocked axially, on the one side toward the plane of symmetry by a plate 40
side by a retaining ring 41 held axially by the satellite holder 3b.

Belleville spring washers 42 are mounted between the satellite holder 3b and the plates 40 so as to seek to push apart the thrusters 29 and 30 axially toward the exterior, so as to exert a bias on the disks 38 and 39.

Lastly, needle bearings 43 and 44 are disposed between the sides of case 1b and plates 36 and, respectively, between the plates 33 and the thrusters 29 and 30.

FIG. 4 illustrates the normal operation of this differential.

Considering, for example, the right side of FIG. 3, let it be assumed that the resistive torque is applied in this state of operation to the plate 36 through the output shaft 7b, and is opposed to the input torque transmitted to plate 33 through the shaft 32 of the planetary gear 9b a relative frictional rotation of plates 33 and 36 will ensue, and the rollers 37 will climb on the opposite ramps formed by the flanks of indentations 34 and 35.

The thruster 30 will therefore be pushed toward the plane of symmetry of the differential, and the cam followers 26 will therefore be unable to run up on the ramps formed by the flanks of the cams 28.

If the resistive torque applied to the output shaft 7b diminishes the rollers 37 will have a tendency to drop back to the bottom of the indentations 34 and 35, then permitting an axial displacement of the thruster 30 toward the exterior. This axial displacement will be produced on the one hand by the bias applied by the Belleville spring washers 42, and on the other hand by the thrust of the cam followers 26 on the rear flank of the corresponding cam 28.

This axial shift of the thruster 30 causes a compression of the clutch disks between plate 40 and the retaining ring 41, resulting in a progressive coupling of the two planetary gears 8b and 9b and consequently of the output shafts 6b and 7b.

It will be noted that the embodiment represented in the drawings offers the advantage of permitting asymmetry between the thrusters 29 and 30, the cam follower 26 being able to remain in the bottom of the cam 28 corresponding to one of these elements while still running up one of the flanks of the cam of the other means.

Reference will now be made to FIGS. 5 to 10. The elements common to the third and fourth embodiments have been given the same reference numbers with a suffix letter a for the third embodiment and letter b for the fourth.

These two epicyclic gear train differentials have, in a known manner, a case 101a, 101b, fastened together with an input bevel gear 102a (not shown in FIG. 8), a ring gear 103a, 103b, a satellite holder 104a, 104b, a planetary gear 105a, 105b, and two output shafts 106a, 106b, and 107a, 107b, respectively.

Figure 6:
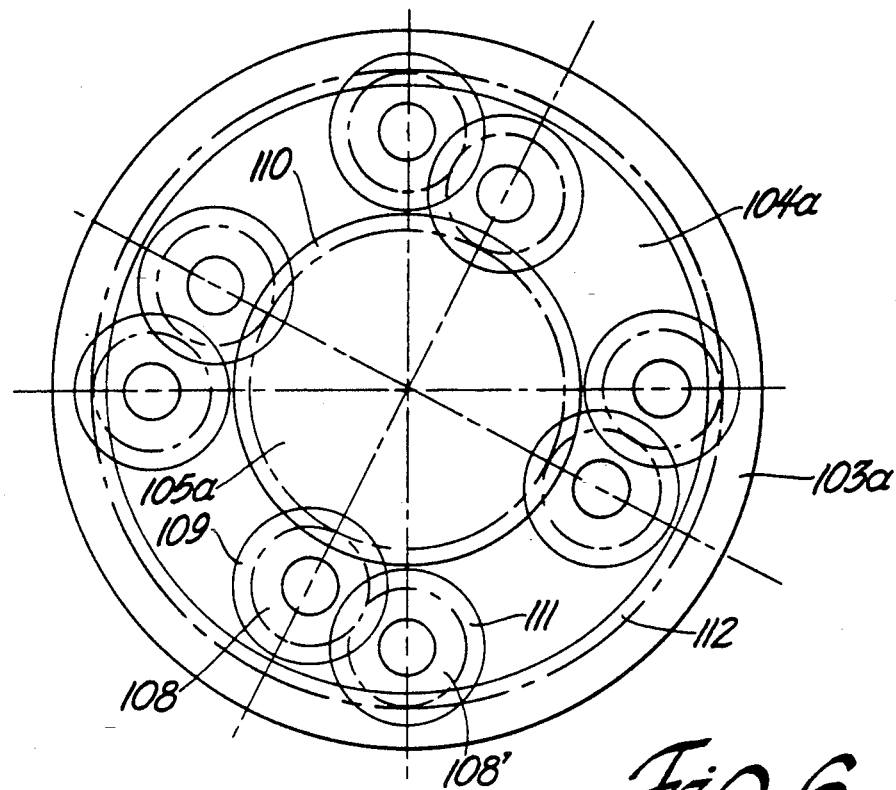
FIG. 6 is a cross section on a smaller scale.

The embodiment in FIGS. 5 and 6 correspond to a differential in which the engine torque input is provided by the ring gear 103a and in which the first output is provided through the satellite holder 104a and the second output through the planetary gear 105a.

In this case, the satellite holder 104a carries a certain number of satellite pairs 108, 108' meshing with one another, the satellites 108 having teeth 109 to mesh with teeth 110 of the planetary gear, and the satellites 108' having teeth 111 to mesh with teeth 112 of the ring gear.

Figure 9:
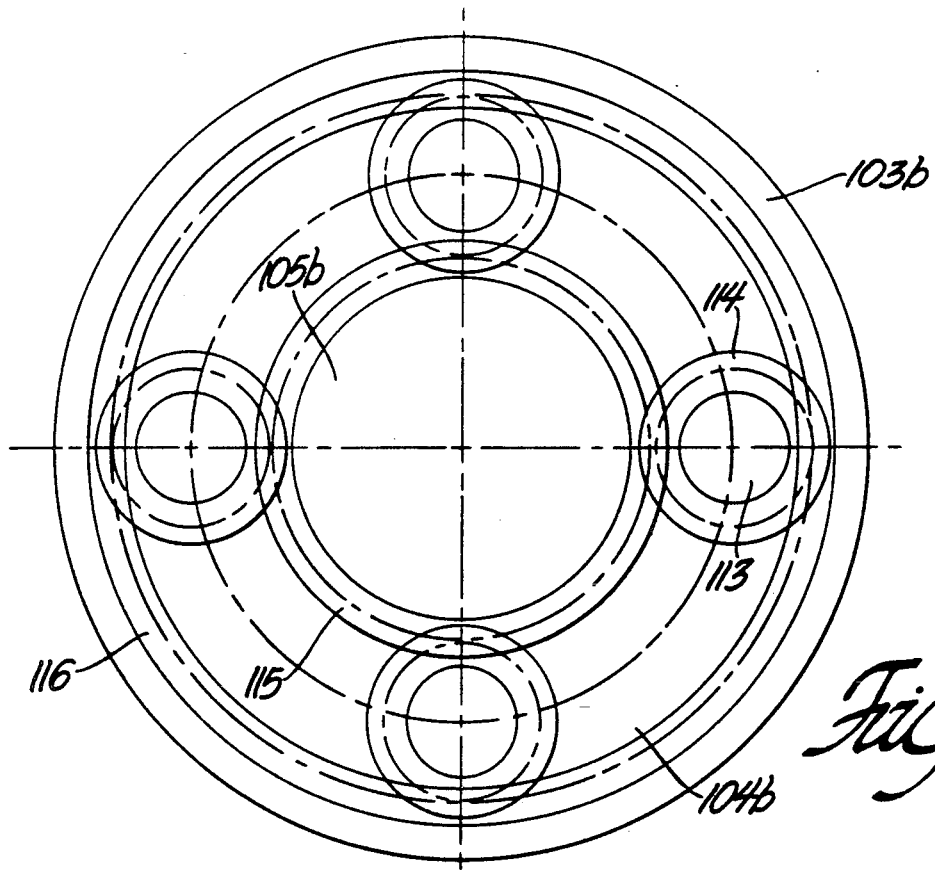
FIG. 9 is a cross section on a smaller scale.
Figure 8:
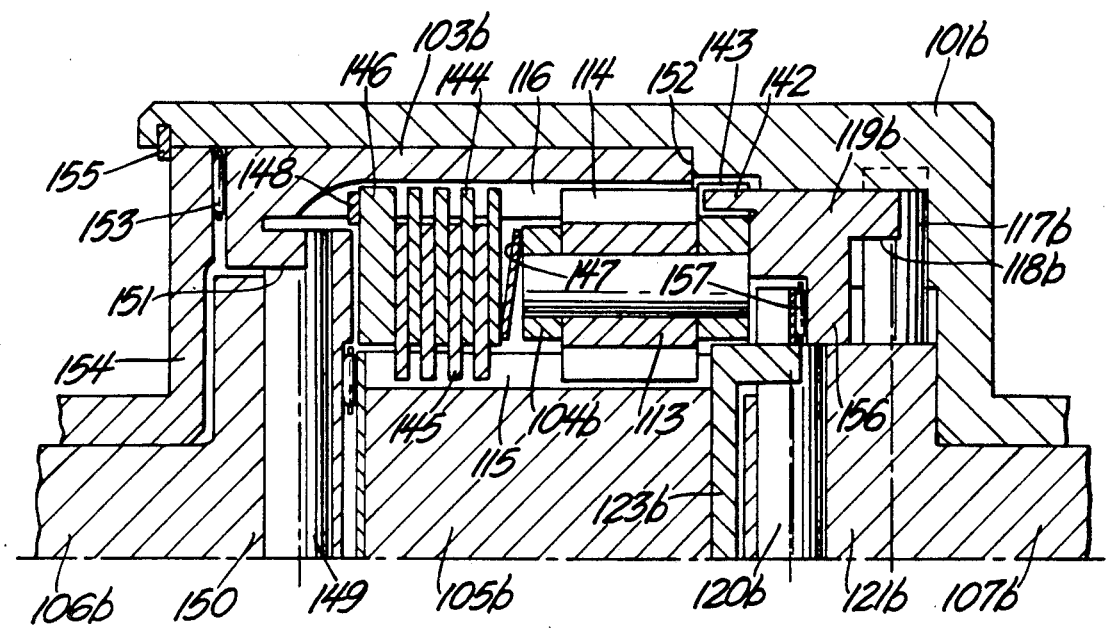
FIG. 8 is an axial section of half of a differential according to a fourth embodiment.

On the other hand, FIGS. 8 and 9 represent a differential whose torque input is provided by the satellite holder 104b, and in which the first output is made through the ring gear 103b and the second output through the planetary gear 105b.

In this case, the satellite holder 104b carries a set of satellites 113 equipped with teeth 114 to mesh simultaneously with the teeth 115 of the planetary gear and teeth 116 of the ring gear.

In both cases, cam followers 117a, 117b are mounted radially in the case 101a, 101b, and fixed with respect to the latter.

These cam followers 117a, 117b, are engaged in cams 118a, 118b of V-shaped cross section, formed in a thruster 119a, 119b. This thruster 119a, 119b, is mounted for movement both rotary and axial in the corresponding case. Furthermore, a second set of radial cam followers 120a, 120b, is mounted in one end 121a, 121b of the output shaft 107a, 107b, and fixed with respect to the latter shaft. The cam followers 120a, 120b, are engaged in cams 122a, 122b of V-shaped cross section formed in an end portion 123a, 123b of the planetary gear 105a, 105b.

Reference will now be made more particularly to the first embodiment shown in FIGS. 5 and 6. The thruster 119a is affixed to the ring gear 103a. It is furthermore thrusting axially against the satellite holder 104a through a needle bearing 124. A counterthruster 125 is made corotational permitting the relative axial displacement of these two parts. Furthermore, two clutch disk assemblies 127 and 128 are disposed between the satellite holder 104a and the counterthruster 125. The disks 127 are corotational with the planetary gear 105a and the disks 128 are corotational with the assembly constituted by the ring gear 103a and the counterthruster 125, these two disk assemblies being interleaved. The counterthruster 125 also bears radial cam followers 129 engaged in radial indentations 130 of V-shaped cross section, formed in the extremities 131 of the output shaft 106a. A needle bearing 132 is disposed between the counterthruster 125 and a Belleville washer 133 held axially on the outer side by a cover 134 affixed to case 101a by a retaining ring 135. Lastly, a needle bearing 136 is disposed between an annular shoulder 137 of the thruster 119a and the radial cam followers 120a.

As shown in FIGS. 7a, 7b, and cams 118a and right side of the figures, indentation 130 being open on the other side.

It will be recalled that the engine torque input is transmitted by means of the bevel gear 102a, the case 101a, and cam followers 117a. Since these cam followers are engaged in the indentations 118a, the torque is transmitted to the thruster 119a affixed to the ring gear 103a, so that the input of torque into the differential is through this ring gear. From the ring gear 103a, a portion of the torque is first of all transmitted to the satellite holder 104a and then, through the medium of the cams 126, to the counterthruster 125 and to the cam followers 129 which, being engaged in the cams 130, transmit this torque to the output shaft 106a. The other portion of the input torque is transmitted through the satellites 108, 108' to the planetary gear 105a which transmits this other portion of the torque by means of its cams 122a, and consequently to the output shaft 107a.

FIG. 7a represents the differential in normal operation. In this state of operation, the resistive torques on the shafts 106a and 107a cause the cam followers 129 and 120a to slide along ramps formed in the cams 130 and 122a, respectively. Abutments 138 and 139, respectively, formed at the end of the ramps limit this sliding movement. IN this position the cam followers 129 force the output shaft 106a to be in its extreme right-hand position in FIG. 5. Since this shaft abuts against the planetary gear 105a is also thrust toward the right the same as the cam followers 120a and consequently the output shaft 107a. Owing to the needle bearing 136, the thruster 119a is likewise pushed to the right, so that the cam followers 117a are held in the bottom of the cams 118a of the thruster 119a.

If now the resistive torque applied to the output shaft 106a decreases abruptly, the cam followers 129 return down the ramps of cams 130 and stop at the bottom of these cams, as represented in FIG. 7b. Shaft 106a, planetary gear 105a and output shaft 107a can thus shift to the left in FIG. 5, thus enabling the input torque applied to the cam the cams 118a, displacing the thruster 119a to the left. Through the medium of the thrust bearing 124 and of the satellite holder 104a, this has the effect of compressing the clutch disks 127 and 128 against the counterthruster 125 and consequently of coupling the output shafts 106a and 107a by the medium of cams 130, cam followers 129, the counterthruster 125, disks 127 and 128, planetary gear 105a, cams 121a and cam followers 120a.

It will be noted that abutments 139 have the effect of limiting the axial force exerted by the cam followers 120a on the planetary gear 105a, which otherwise might become greater than the force exerted at the level of the input and consequently prevent the clutch operation by the force of the engine input torque.

Of course, this clutch action increases progressively with the resistive torque applied to the output shaft 106a. Spring bias can furthermore be supplemented by the Belleville washer 133 and possibly by another Belleville washer 141 disposed between the pack of disks 127, 128, and the satellite holder 104a.

In the case not represented in the drawings, in which the resistive torque applied to the output shaft 107a decreases, the same phenomenon occurs, namely that the cam followers 120 can return down the ramps of the cams 122a and thus permit a leftward displacement of the output shaft 107a. The result is that the needle bearing 136 is retracted, permitting a leftward displacement of the thruster 119a under the effect of the torque applied by the cam followers 117a running up the ramps of the cams 117a, and this also has the effect of actuating the clutch constituted by the friction disks 127 and 128.

Both in the present embodiment and in the one described below, the coupling is produced between the two outputs. It is known, however, that the locking up of a differential can also be obtained by coupling the input and one output.

This could be brought about without difficulty in the present case by axially reversing the clutch and the satellite holder and coupling the disks 128 so as to rotate with the ring gear 103a, not with the counterthruster 125.

Now we shall return to the second embodiment in FIGS. 8 and 9, whose description was started above with regard to its parts in common with the first embodiment. The thruster 119b is made corotational with the satellite holder 104b by means of fingers 142 cooperating with cams 143 in this satellite holder. Two clutch disk assemblies 144 and 145 are disposed between an end disk 146 and a Belleville washer 147. The Belleville washer 147 thrusts against the satellite holder 104b and the end disk 146 is held on the ring gear 103b by a retaining ring 148. Radial cam followers 149 are mounted fixedly in the end 150 of the shaft 106b and are engaged in cams 151 of V-shaped cross section in the ring gear 103b. This ring gear 103b is held fixedly by a shoulder 152 on this case, and on the other hand by a needle bearing 153 thrusting against a cover 154 affixed to the case by a retaining ring 155. The thruster 119b furthermore forms a shoulder 156 which is thrusting against the end 123b of the planetary gear 105b through the medium of another needle bearing 157. In the present embodiment, the indentations 118b, 122b and 151 all open axially on the said side of the differential, namely the right side of FIG. 8.

Figure 10A:
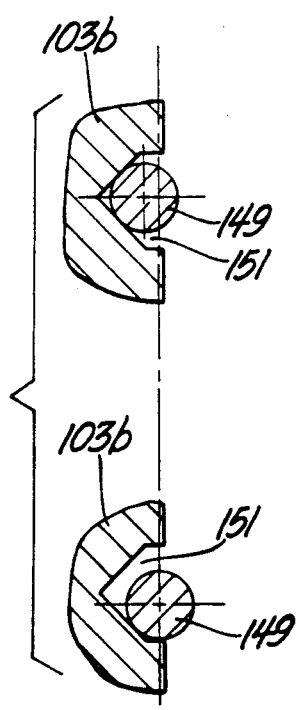
FIGS. 10a and 10b illustrate the operation of this fourth embodiment.
Figure 10B:
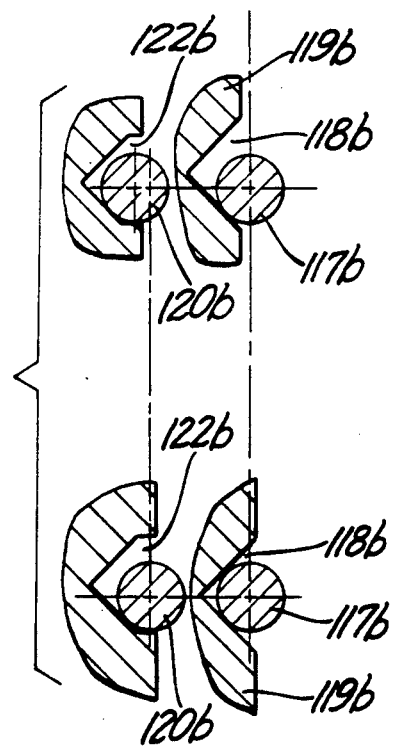

The normal operation of this differential is represented in FIG. 10b and is similar to that of FIG. 7a. The input torque is applied as before to the case 101b and to the cam followers 117b which, through the medium of the cams 118b, transmit this torque to the thruster 119b. This device 119b then transmits the input torque to the satellite holder 104b through the pins 142. A part of this torque is through the medium of the cams 116, then through the cams 151 to the cam followers 149 and to the output shaft 106b. The input torque is likewise applied through the medium of the satellites 113 to the planetary gear 105b and, through the medium of the cams 122b, to the cam followers 120b and to the output shaft 107b.

In case of a loss of the resistive torque applied to the output shaft 106b, the cam followers 49 drop back to the bottom of the cams 151, thus permitting the assembly consisting of shaft 106b, planetary gear 105b and shaft 107b to shift leftward in FIG. 8, which has the effect of retracting the needle bearing 157 and permitting a leftward shift of the thruster 119b under the effect of the input torque applied by the cam followers 117b which run back up one of the ramps formed by the cams 118b. Since the thruster 119b is pushing against the satellite holder 104b, the latter also shifts leftward, compressing the clutch disks 144 and 145 by means of the Belleville washer 147. The output shafts 106b and 107b are thus coupled together by means of the cam followers 149 of the ring gear 103b, disks 144 and 145, the planetary gear 105b, and the cam followers 120b. If it is the resistive torque applied to the output shaft 107b that decreases, the cam followers 120b return to the bottom of the cams 122b thus retracting the needle bearing 157 and likewise permitting the leftward displacement (in FIG. 8) of the thruster 119b so that, here again, the output shafts 106b and 107b are coupled together through the clutch constituted by the disks 144 and 145.

Figure 11:
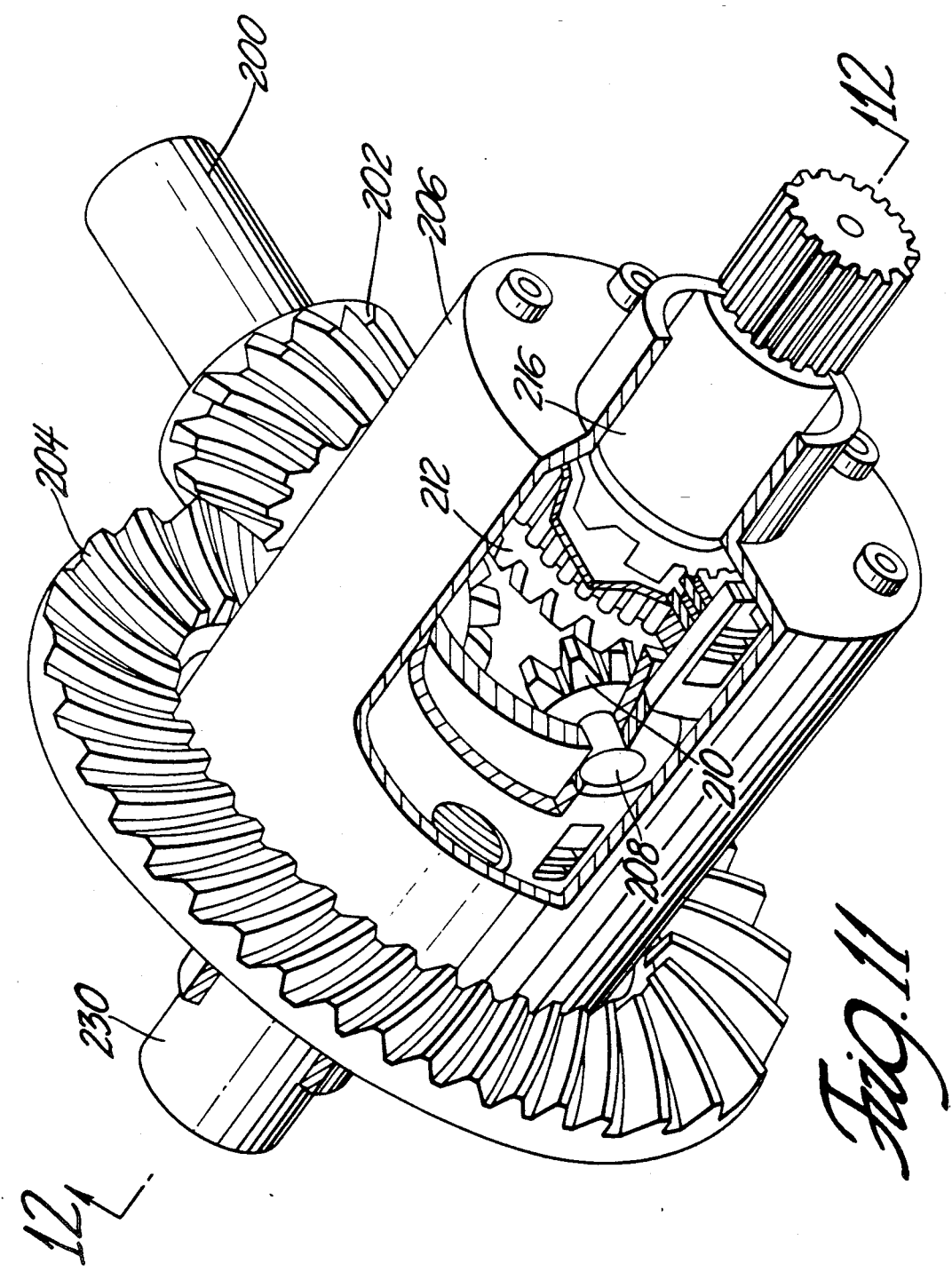
FIG. 11 is a partially sectional perspective view of a further embodiment.
Figure 12:
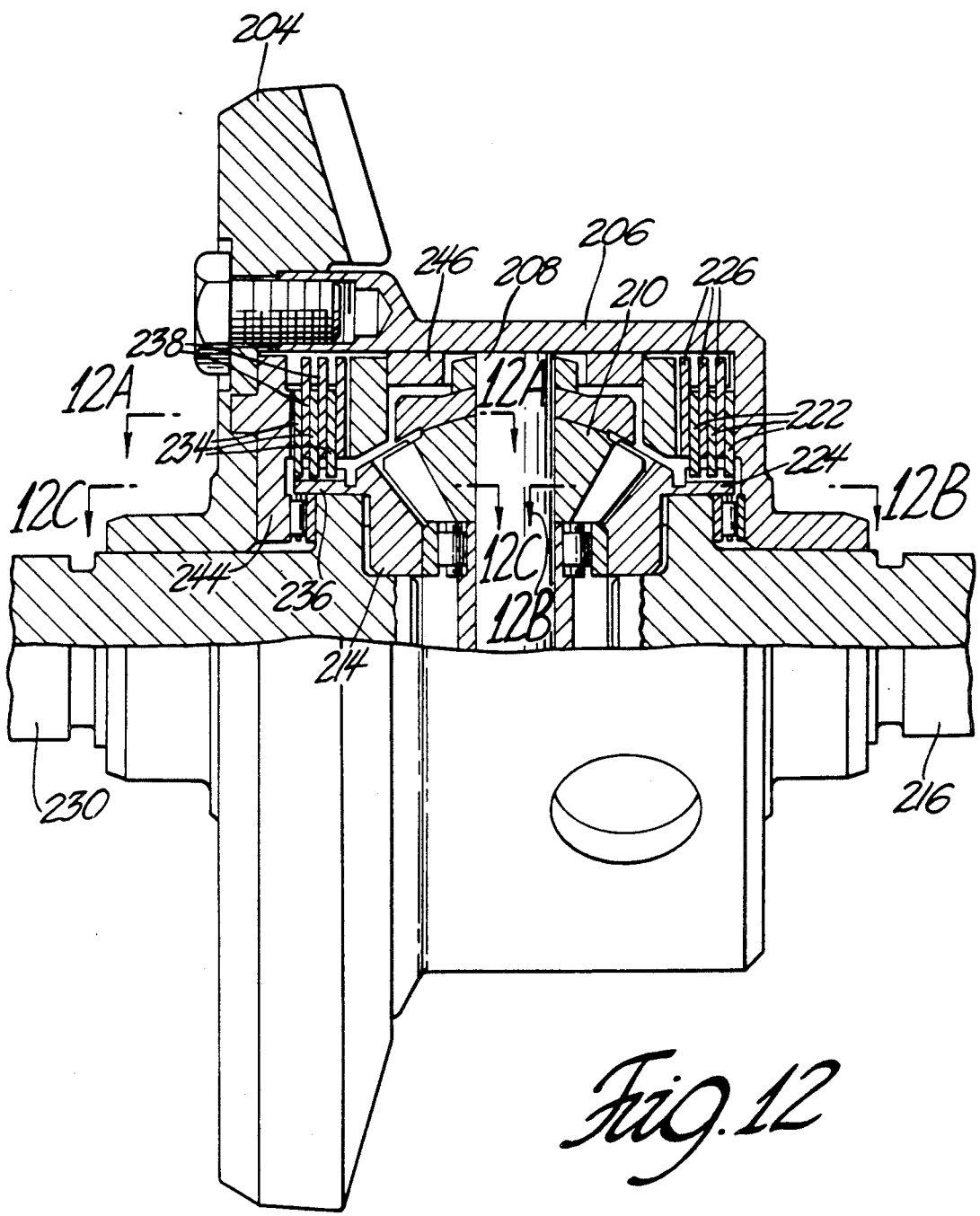
FIG. 12 is a sectional view along line 12—12 of FIG. 11.
Figure 12A:
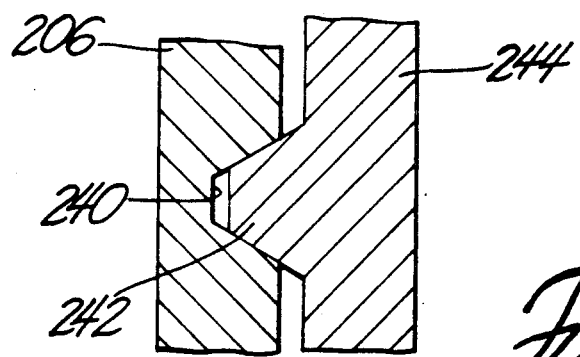
FIGS. 12A, B and C are views along line 12A, 12B and 12C of FIG. 12 depicting three torque responsive means.
Figure 13A:
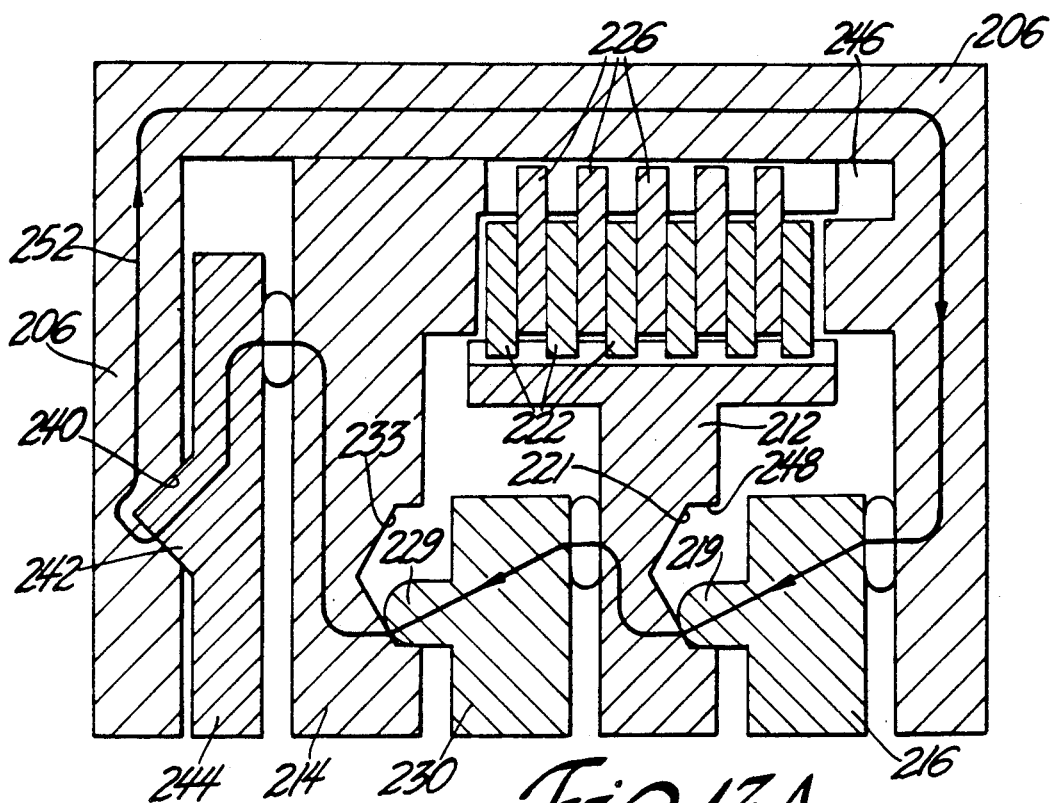
FIG. 13A and 13B are schematic representations showing the torque distribution functioning of the differential under different wheel traction situations.
Figure 13B:
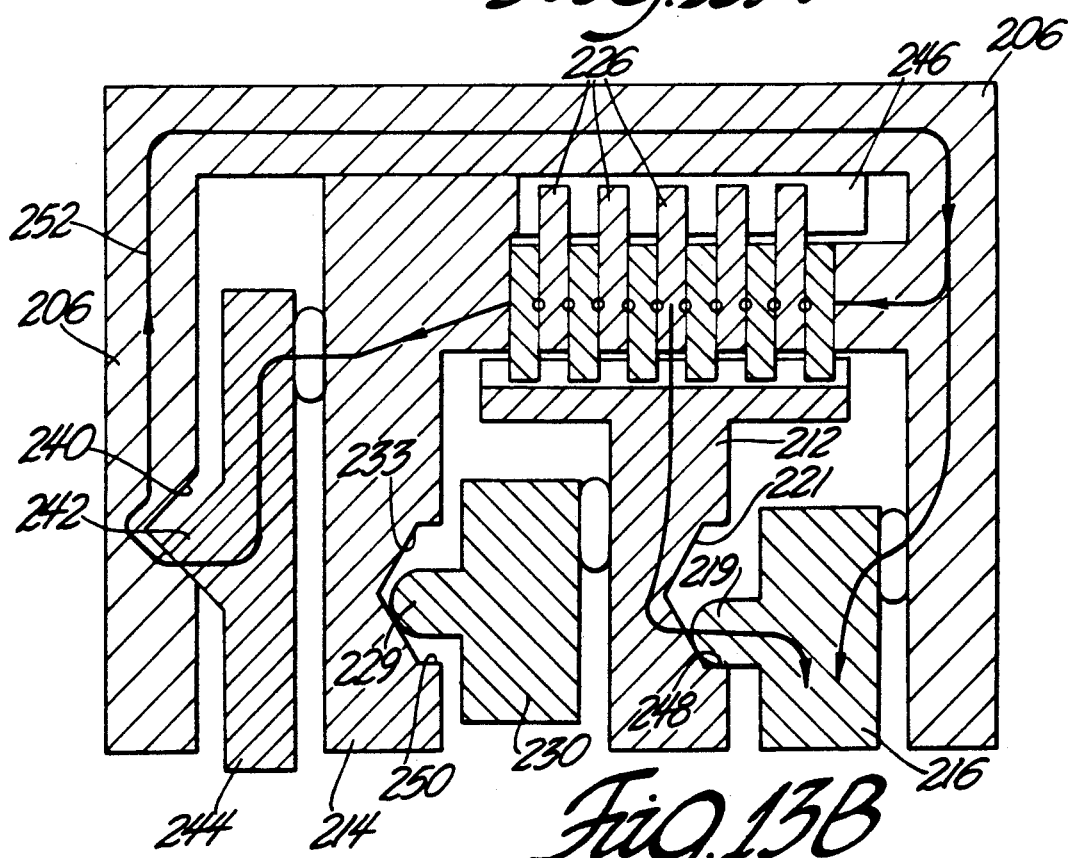

FIGS. 11, 12, 12A, B, C disclose a further embodiment of the invention the operation of torque distribution to the driving wheels is diagrammatically represented in FIGS. 13A and 13B. Where appropriate, the same numbers apply to the elements of FIGS. 11 through 13.

An engine propeller shaft 200 through pinion gear 202 provides engine input or torque to a crown gear 204 fixed to a differential casing 206. Gear spindle 208 is fixed for rotation with casing 206 and rotatably supports bevel gears 210 which, in turn, mesh with and rotate side output gears 212, 214.

Figure 12B:
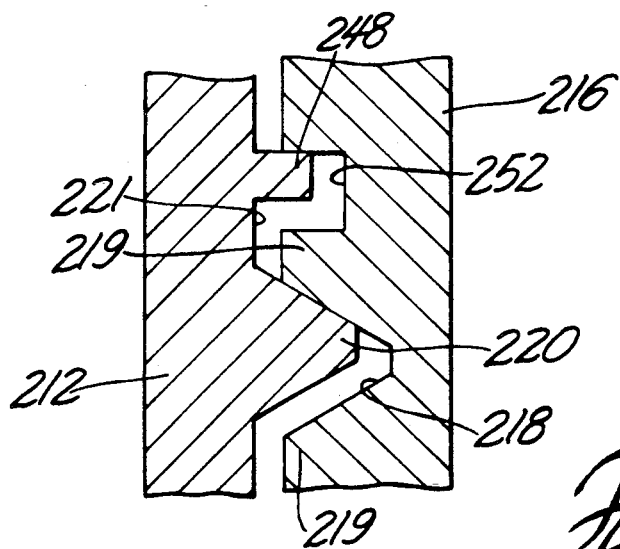

Side gear 212 is drivingly connected to wheel output shaft 216 through a suitable first cam device shown in FIG. 12B. The first cam device comprises V-shape recesses 218 formed in output shaft 216 and into which side gear projections 220 and recesses 221 mesh. Side gear 212 is axially slidable on the inner end of output shaft 216.

While a single clutch mechanism may be used as shown in the modifications of FIGS. 5 and 8 as well as the diagrammatic representations of FIGS. 13A and 13B, the modification of FIG. 12 utilizes two clutches.

A first clutch device includes a first set of clutch disks 222 fixed to a hub 224 integral with side gear 212 and a second set of disks 226 fixed for rotation with casing 206.

Figure 12C:
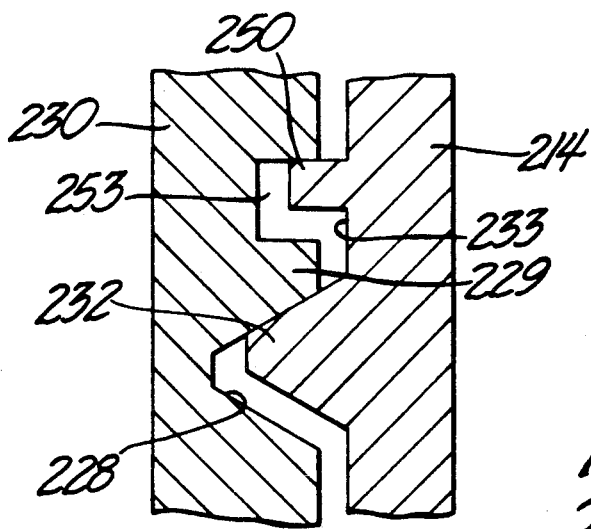

Referring to FIG. 12C, a second cam device comprises V-shape recesses 228 and projections 229 are formed in output shaft 230 and which mesh with side gear projections 232 and recesses 233. Side gear 214 is axially slidable on the inner end of output shaft 230.

A second clutch device includes a third set of disks 234 fixed to hub 236 integral with side gear 214 and a fourth set of disks 238 fixed for rotation with casing 206.

Referring to FIG. 12A, a third cam device comprises V-shaped recesses 240 formed in casing 206 and into which projections 242 in a cam plate 244 mesh. Cam plate 244 is concentric with output shafts 216 and 230 and axially movable relative thereto.

Clutch disk sets 226 and 238 are secured for rotation with casing 206 through a member 246 fixed for rotation with casing 206 but axially movable relative thereto as through a splined connection, not shown, therebetween. Cam plate 244 abuttingly engages member 246 and axial movement of the plate imparts corresponding axial movement to member 246 and disk sets 226 and 238 to engage or disengage the first and second clutch devices.

For reasons which will be discussed further below, it is most important that means be provided to limit the resistive driving wheel torque or force that can act in opposition to the engine input torque the latter force which is utilized to apply the clutch device or devices. Accordingly, stop elements 248 and 250 are respectively formed on side gears 212 and 214 and respectively project within output shaft recesses 252 and 253. As seen in FIGS. 12B and 12C, stop elements 248 and 250 in abutting against the sides of recesses 252 and 253 limit the relative rotary differential movement which can occur between side gear 212 and coacting output shaft 216 as well as between side gear 214 and its coacting output shaft 230. This stop action, therefore, limits the resistive torque which can act in opposition to the clutch applying force of the engine input torque. If such stop or torque limiting elements were not provided it would be possible for the resistive torque forces to overcome the engine input torque and disrupt the clutch applying action transmitted through cam plate 244.

As shown in earlier embodiments, a single clutch device may be utilized and such is illustrated in FIG. 13.

The operation of the embodiment of FIGS. 11 and 12, as well as some of the other modifications, may be better understood by reference to the diagrammatic representation of FIGS. 13A and B and the operation which now will be described.

FIG. 13A represents the open differential mode wherein both driving wheels are under full traction and the differential functions in a normal or non-locked up manner. In this case the resistive torque at each of the output shafts 216 and 230 overcomes the input torque at side gears 212 and 214 whereby cam projections 219 and 229 ride up the V recesses 221 and 233 causing clutch opening axial movement of the side gears in opposition to the engine input torque force acting through cam plate 44 and member 246. Thus, in this mode the axial force acting through each gear 212 and 214 is greater than input torque axial thrust thereby creating a resultant axial force to move cam plate 244 toward casing 206 causing projections 242 to nest fully within casing recesses 240 and moving member 246 to open the clutch device As seen by the power flow line 252, in this mode engine torque by-passes the clutch device and flows through the side gears 212 and 214 to output shafts 216 and 230.

FIG. 13B illustrates the clutch application mode wherein one of the wheels has reduced traction as compared to the other wheel. In this case because of slippage and loss of traction of its associated wheel, output shaft 230 has a resistive torque which creates a force which is less than the engine input force whereby cam follower 229 moves to the bottom of V recess 233 enabling cam plate projection 242 to be driven or cammed axially away from casing recess 240, in turn, causing side gear 214 and member 246 to move axially to the right to engage the clutch device thereby coupling the casing 206 to side gear 214 and progressively locking up the differential and insuring that most of the engine power or torque is transmitted to the wheel having the greatest traction. Again, as indicated by the power flow line 252, engine power or torque is transmitted both from casing 206 through pinion 210, side gear 212 to output shaft 216 as well as the latter receiving additional torque through the clutch in an amount proportional to the loss of resistive torque at output shaft 230. For instance, if the loss of traction at output shaft 230 is not total, the torque could split 75% to output shaft 216 and 25% to output shaft 230. The degree of clutch application is thus determined by the force differential between the input torque and the resistive torque of the wheel losing traction Referring to FIG. 12B, to assure that the resistive torque of output shaft 216, the associated wheel of which in under the most traction, does not create a force and axial thrust which interferes with or overcomes the engine input force actuating the clutch device, stop element 248 abuts against the side of recess 252 preventing any further axial thrust in opposition to the input torque generated thrust. If the resistive torque force of the wheel having traction is not limited it could, under certain circumstances, prevent the engine input force from progressively applying the clutch device thereby causing engine power also to flow to the wheel without traction in an amount causing said wheel to spin.

It is unique to applicant's invention that engine input torque acts directly on the third cam device 240, 242, 244 to create a clutch applying force which constantly senses and acts against the resistive torques of the driving wheels and thereby controls the progressive locking of a clutch means and, thereby, the amount of power going to the wheel with the most traction. It is a further unique feature of this invention to provide means to limit the resistive torque forces which act in opposition to the engine input torque force thereby preventing opening of the differential when one wheel is slipping or otherwise has insufficient traction.

Other modifications may be made within the intended scope of the invention as set forth in the hereinafter appended claims.

What is claimed is:

1. A self-locking differential gear assembly of the type including an input element, a pair of output elements adapted respectively to be connected to wheel driving output shafts, coupling mechanism movable to connect two of the three input and output elements, a first pair of torque responsive devices respectively operatively connected to each output shaft, said torque responsive device being adapted to generate force to oppose the connecting movement of the coupling mechanism when the resistive torque of the output elements is above a given value; the improvement wherein:

an engine output torque responsive mechanism operatively connected to the input element and adapted to impart a connecting movement force to the coupling mechanism; the torque difference between the engine output torque responsive means and at least one of the said first pair of torque responsive devices imparting movement to oppose the connecting force of the coupling mechanism, each of said first pair of torque responsive devices including stop elements for limiting the force opposing the coupling mechanism connecting movement force of the engine output torque responsive mechanism.

2. A self-locking differential gear assembly of the type as set forth in claim 1 wherein each of said first pair of torque responsive devices receives a torque force from the input element which acts in opposition to the resistive torque of each output shaft.

3. A self-locking differential gear assembly of the type as set forth in claim 1 wherein the engine output torque responsive device is operatively connected between the input element and the coupling mechanism.

4. A self-locking differential gear assembly of the type as set forth in claim 1 wherein each of said first pair of torque responsive devices receives a torque force from the input element which acts in opposition to the resistive torque of each output shaft, the engine output torque responsive mechanism being operatively connected between the input element and the coupling mechanism.

5. A self-locking differential gear assembly of the type as set forth in claim 1 wherein each of said first torque responsive devices includes a first cam element rotatable with its output shaft, a second cam element rotatable with its associated output element and movable relative to the output shaft of the first cam element, said movement enabling the engine output torque responsive means to engage the coupling devices when the resistive torque of one of said first torque responsive means falls below the torque force generated by the engine torque responsive mechanism.

6. A self-locking differential gear assembly/of the type including an engine output driven member, an input gear element connected to said member, a pair of gear elements adapted respectively to be connected to wheel driving output shafts, a coupling mechanism movable to connect two of the three input and output gear means, first and second torque responsive devices respectively operatively connected to each output shaft, each torque responsive device being adapted to generate a force to oppose the connecting movement of the coupling mechanism when the resistive torque of the output elements is above a given value; the improvement wherein:

a third torque responsive device operatively connected to the engine output driven member and adapted to impart a connecting movement force to the coupling mechanism; the torque difference between the third torque responsive device and at least one of the said first and second torque responsive devices imparting movement to oppose the connecting force of the coupling mechanism.

7. A self-locking differential gear assembly of the type as set forth in claim 6 in which the first and second torque responsive devices are respectively incorporated in the input gear elements and the output gear elements.

8. A self-locking differential gear assembly of the type as set forth in claim 6 in which said third torque responsive device is operatively connected between the engine output driven member and the coupling mechanism.

9. A self-locking differential gear assembly of the type as set forth in claim 8 in which each of said first and second torque responsive devices includes stop elements for limiting the force opposing the connecting movement force of the third torque responsive device.

10. A self-locking differential gear assembly of the type as set forth in claim 6 wherein the first and second torque responsive devices receive a torque force from the input element which acts in opposition to the resistive torque of each output shaft.

11. A self-locking differential gear assembly of the type as set forth in claim 6 wherein the third torque responsive device includes a first cam element rotatable with the engine output driven member, a second cam element coacting with the first cam element and movable relative to the first cam element to impart a coupling means engaging force when the resistive torque of said first or second torque responsive devices is less than the torque force generated by the engine output driven member.

12. A self-locking differential gear assembly of the type as set forth in claim 11 wherein each of the first and second torque responsive devices includes a stop element for limiting the force opposing the torque force generated by the engine output driven member.

* * * * *